May 31, 1949.　　　　G. O. KIMMELL　　　　2,471,571
SEPARATOR
Filed April 21, 1947　　　　　　　　　　　　3 Sheets-Sheet 1
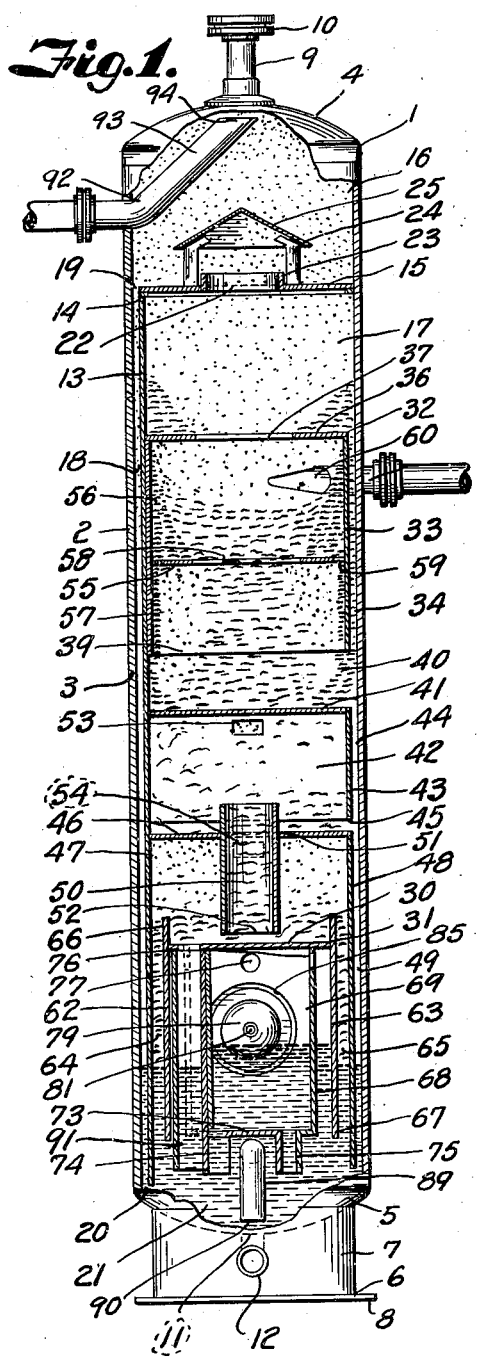
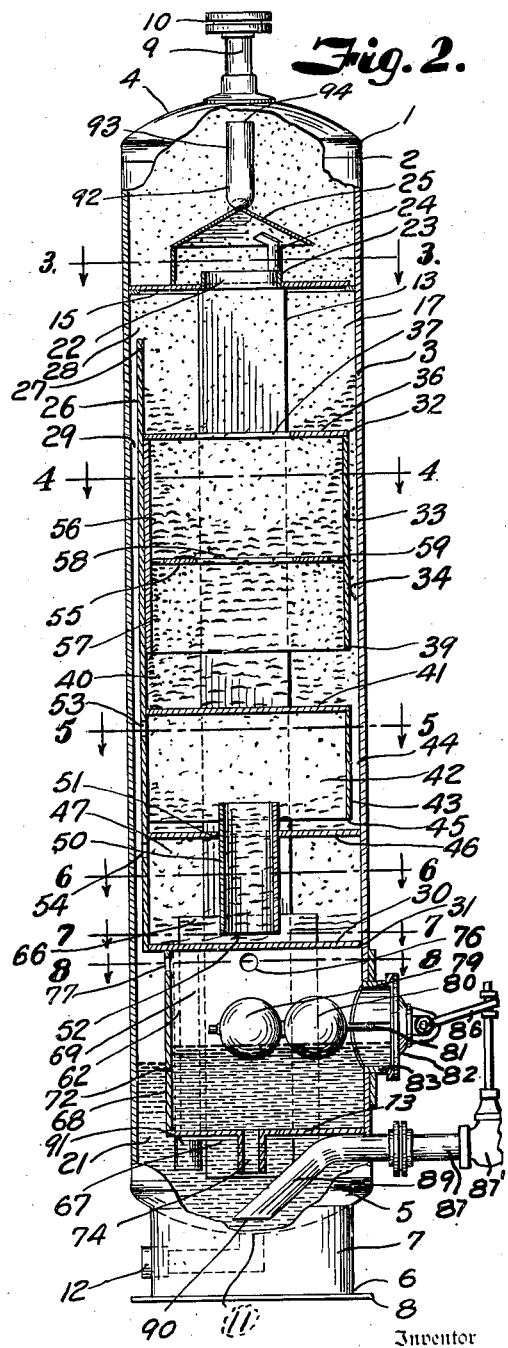
Inventor
Garman O. Kimmell
By Fishburn & Mullendore
Attorneys May 31, 1949.  G. O. KIMMELL  2,471,571
SEPARATOR Filed April 21, 1947  3 Sheets-Sheet 2

Inventor
Garman O. Kimmell
Fishburn & Mullendore
Attorneys

May 31, 1949.  G. O. KIMMELL  2,471,571
SEPARATOR
Filed April 21, 1947  3 Sheets-Sheet 3
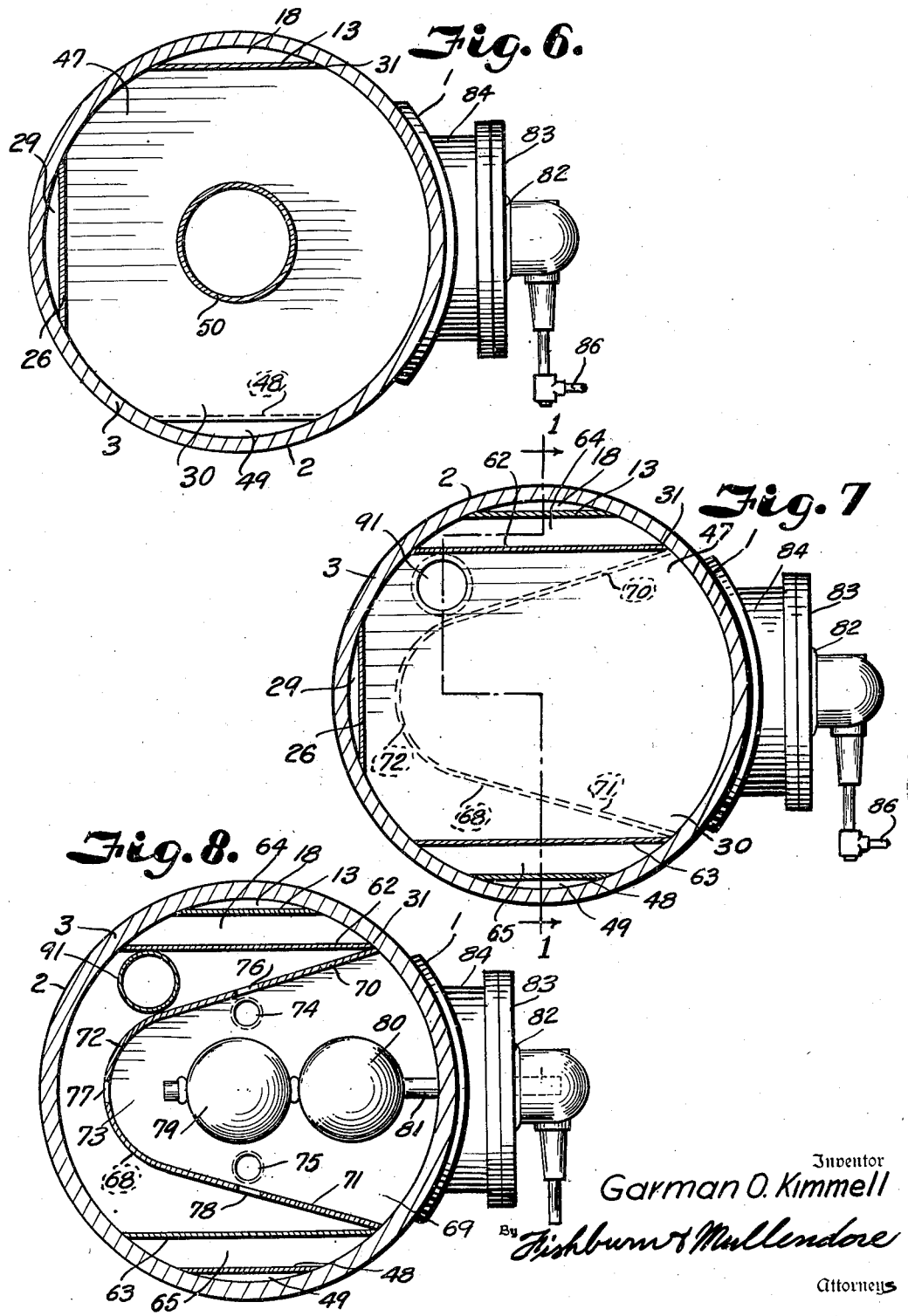
Inventor
Garman O. Kimmell
By Fishburn & Mullendore
Attorneys Patented May 31, 1949

2,471,571

UNITED STATES PATENT OFFICE 2,471,571

SEPARATOR

Garman O. Kimmell, Oklahoma City, Okla., assignor to Black, Sivalls & Bryson, Inc., Kansas City, Mo., a corporation of Delaware Application April 21, 1947, Serial No. 742,806

9 Claims. (Cl. 252—361)

This invention relates to separators of the type disclosed in United States Letters Patent No. 2,353,833, issued to me July 18, 1944, for handling well flows having quantities of gas entrained with foamy liquids.

The principal object of the present invention is to provide a separator having greater separation efficiency and capacity than the separator of the patent.

Other objects of the invention are to provide a separator structure similar to that disclosed in the patent with a plurality of tray sections between the lower secondary separator section and the float section for facilitating separation of the foam and oil; to provide a separator with means for preventing passage of foam into the float chamber; to provide for release of gas from the tray sections in bypass relation with the lower secondary and primary sections of the separator; and to provide a structure which facilitates reduction of foam into substantially bubble free liquid.

In accomplishing these and other objects of the invention hereinafter pointed out, I have provided improved structure, the preferred form of which is illustrated in the accompanying drawings wherein:

Fig. 1 is a vertical section through a separator constructed in accordance with the present invention, the upper part of the section being taken through the axis of the separator and lower part being taken on the line 1—1 of Fig. 7.

Fig. 2 is a central vertical section taken at right angles to the section shown in Fig. 1.

Fig. 6 is a horizontal section through the lower tray section on the line 6—6 of Fig. 2.

Fig. 7 is a horizontal section through the lower portion of the lower tray section on the line 7—7 of Fig. 2.

Fig. 8 is a horizontal section taken through the float section of the separator on the line 8—8 of Fig. 2.

Figure 3:
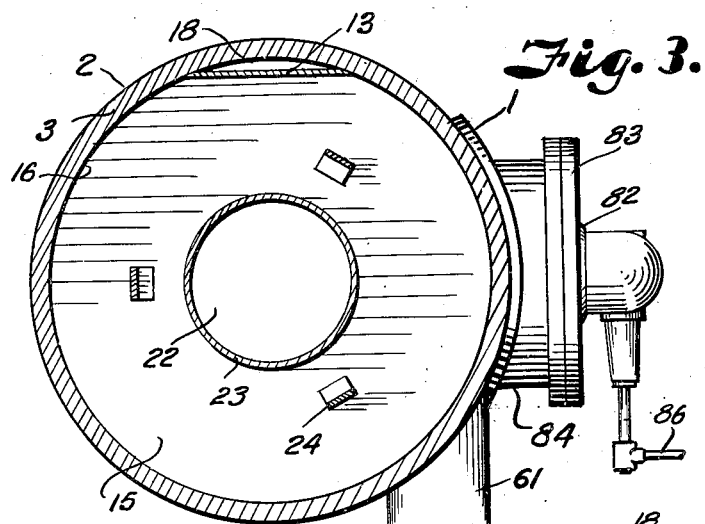
Fig. 3 is a cross section through the gas quieting section of the separator on the line 3—3 of Fig. 2.
Figure 4:
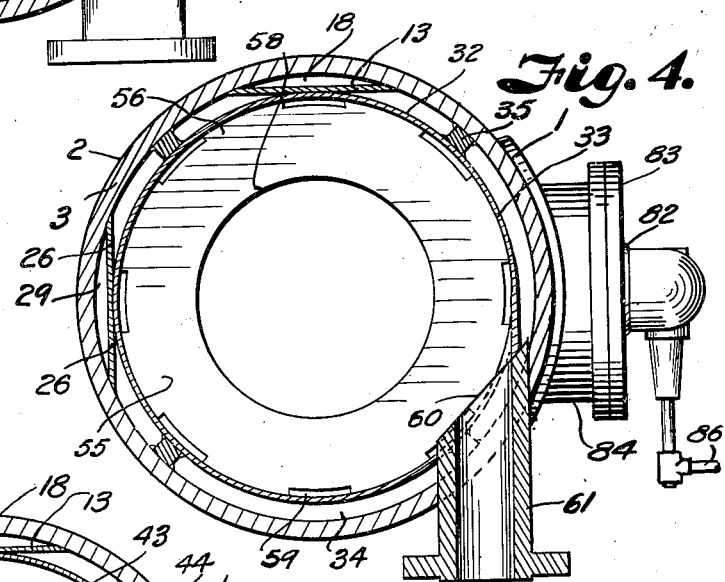
Fig. 4 is a horizontal section through the primary separating section on the line 4—4 of Fig. 2.
Figure 5:
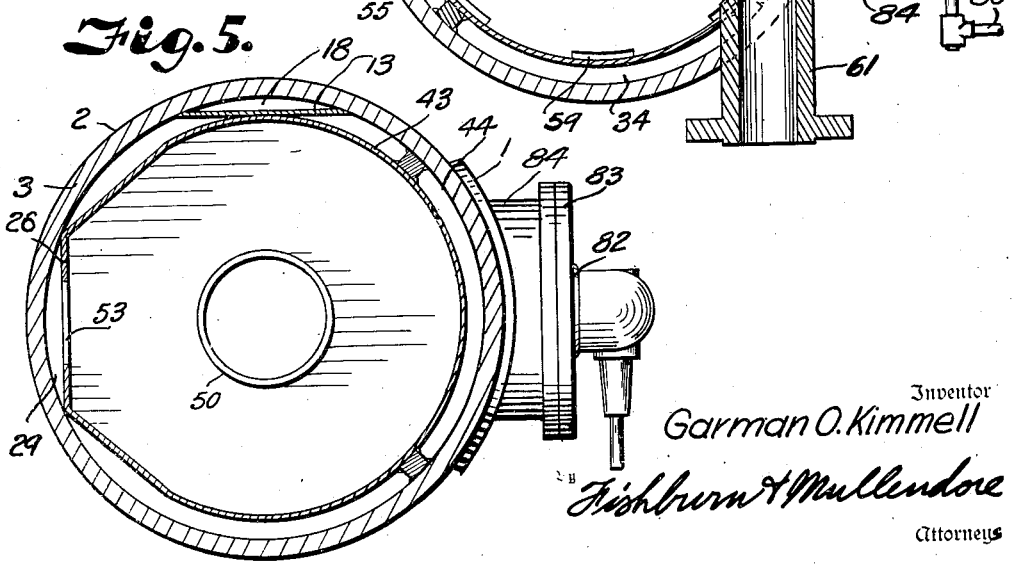
Fig. 5 is a horizontal section through the upper tray section on the line 5—5 of Fig. 2.

Referring more in detail to the drawings:

1 designates a separator constructed in accordance with the present invention and which includes an elongated vertically arranged shell 2 having a cylindrical wall 3, a top 4 and a bottom 5. The bottom 5 of the shell is supported on a suitable stand 6 which comprises a collar 7 seating the bottom 5 of the shell and having a footing flange 8 for mounting the separator on a suitable foundation (not shown). The top 4 is provided with a connection 9 mounting a safety head 10 for relieving pressure above the safe working pressure for which the shell is constructed. The bottom of the shell has a drain outlet 11 connected with a drain duct 12 that extends laterally through the stand 6.

Located in a chordal plane at one side of the shell is a vertical partition 13 having its upper end 14 connected with a horizontal partition 15 that extends transversely within the shell at a point spaced below the top 4 to provide the bottom of a quieting chamber or section 16 and the top of an upper secondary separating section 17.

The vertical partition 13 has its side edges suitably welded to the inner face of the wall 3 to provide a vertical passageway 18 opening at its upper end into the quieting section as at 19 and which terminates at its lower end slightly above the bottom 5 to provide an outlet 20 into the bubble free liquid section 21 that is located within the shell and has the bottom thereof formed by the bottom 5 of the shell. The partition 15 has an axial opening 22 encircled by an upstanding flange 23 and supported thereover on legs 24 is a cone-shaped cap 25 which forms a stop for any liquid spray discharged through the opening 22 from the underside of the partition 15. The liquid stopped by the cap and falling within the quieting chamber drips from the rim of the cap and onto the partition 15 from where it drains through the duct 19 into the bubble free liquid section 21.

Another side of the shell is also provided with a vertical partition 26 located in chordal plane at right angles to the partition 13. The partition 26 has its upper end 27 terminating below the partition 15 to provide an inlet 28 to the vertical passageway 29 that is formed between the partition and portion of the shell wall subtended thereby. The partition 26 terminates a considerable distance above the bottom 5 and connects with a transverse partition 30 that extends horizontally across the shell and forms the top of a canopy section 31 which is located directly above the bubble free liquid section 21.

Supported within the shell and spaced below the partition 15 is an inner cylinder 32 having an annular wall 33 spaced inwardly from the cylindrical wall of the shell to provide a passageway 34 therearound with the exception of the space occupied by the passageways 18 and 29 as best shown in Fig. 2. The cylinder is supported within the shell by spacers 35 located within the passageway 34 and connecting the wall 33 with the wall 3. The cylinder 32 has a top 36 provided with an axial opening 37 located directly under the opening 22. The top 36 cooperates with the partition 15 to form the upper secondary separating section 17. The lower edge 39 of the wall 33 terminates in spaced relation, as indicated at 40, with a transverse partition 41 that forms the top of an upper tray section 42. The partition 41 has a depending skirt 43 spaced inwardly from the wall 3 and joins with the sides of the partition 26, thereby providing a passageway 44 therearound with the exception of the space occupied by the vertical passageways previously described. The lower edge 45 of the skirt 43 terminates above another horizontal partition 46 that forms the top of a lower tray section 47.

The partition 46 forming the top of the lower tray section extends completely across the shell and has a side thereof opposite the partition 13 cut away to connect with a partition 48 that is also located in a chordal plane and has its sides welded to the shell to form a vertical passageway 49 leading to the bubble free liquid section of the separator, the partition 48 terminating substantially at the level of the terminal point of the partition 13. The upper and lower tray sections are interconnected by an axial tube 50 that projects through an opening 51 in the horizontal partition 46 to form an annular weir or overflow for foam accumulating in the upper tray section and to discharge the foam into the lower tray section. The lower end of the tube terminates short of the partition 30 to provide an outlet 52 thereunder. The tray sections have gas outlets 53 and 54 located near the underside of the partitions 41 and 46 respectively so that any gas accumulating therein may flow therethrough into the vertical passageway 29 leading to the upper secondary section previously described.

The cylinder 32 is divided horizontally by a partition 55 to form a primary separation chamber 56 and a lower secondary section 57. The partition 55 has an axial opening 58 through which foam accumulating in the primary separation chamber flows into the lower secondary section. The periphery of the partition is also provided with notches 59 for discharge of liquid components of the flow. The flow is admitted to the primary chamber through a tangential inlet 60 having connection through a flanged nipple 61 that is adapted to be connected with a pipe line leading from the well or source of fluid supply. The partion 30 has the sides thereof adjacent the vertical partitions 13 and 48 spaced therefrom and connected with partitions 62 and 63 that extend on chordal planes and have their ends welded to the inner wall of the shell to provide downflow passageways 64 and 65.

The upper ends of the partitions 62 and 63 extend above the transverse partition 30 to form weirs or dams 66 over which the foam may flow for support upon the body of bubble free liquid contained in the bubble free liquid section 21. The partitions 62 and 63 extend below the normal level of the liquid to provide liquid seals 67 for preventing discharge of foam thereunder and into the body of liquid in the bubble free liquid section.

Formed between the partitions 62 and 63 by means of a partition 68 which is of substantially U-shaped horizontal section as shown in Fig. 8 is a float chamber 69, the terminals 70 and 71 of the partition being welded to the inner surfaces of the shell adjacent the edges of the partitions 62 and 63, and the central rounding portion 72 being spaced from the wall of the shell. The upper edge of the partition 68 is connected with the underside of the partition 30 and the lower edge connects with a bottom 73 that separates the interior of the float chamber from the bubble free liquid section 21. In order to provide inlet for the liquid into the float chamber, the bottom 73 carries inlet nipples 74 and 75 that depend downwardly within the body of liquid contained in the bubble free liquid section. The top of the float chamber is vented under the hood through lateral ports 76, 77 and 78 as shown in Fig. 8. Located in the float chamber and adapted to float on the body of liquid contained therein are floats 79 and 80 mounted on a float rod 81 that is pivotally journalled in a packed trunnion 82 carried on a manhole cover 83. The manhole cover 83 is attached to a laterally extending collar 84 that encircles an opening 85 (Fig. 1) formed in the wall 3 of the shell as shown in Fig. 2.

The outer end of the float stem carries a lateral arm 86 that is connected with the actuating stem of a valve 87' in an outlet duct 87 (Fig. 2) for regulating discharge of liquid from the separator. The outlet duct 87 extends through the wall of the shell and terminates in a downwardly and inwardly extending inlet portion 89 to form an inlet 90 located slightly above the bottom 5. Bubble free liquid accumulating in the lower tray between the weirs 66 drains into the bubble free liquid section 21 through a duct 91 (Figs. 1, 7 and 8).

The gas is discharged from the dry gas or quieting section 16 through a gas outlet duct connection 92 that extends through the side wall of the shell and which terminates in an upwardly and inwardly extending portion 93 having an inlet 94 located slightly below the top 4 of the shell, as shown in Figs. 1 and 2.

Assuming that the separator is constructed and assembled as described, the operation is as follows:

Liquid, gas and foam are delivered into the separator through the tangential inlet 60 which causes the flow to move in circumferential convolution about the wall of the primary separating chamber 56. The tangential inlet effects generation of substantially high centrifugal forces which tend to force separation of the various components of the flow in accordance with their densities. The free gas being the lighter works its way upwardly through the central opening 37 into the upper secondary separating section 17. The foam component being the next lightest passes through the opening 58 in the partition 55 and builds up in the lower secondary section 57. Bubble free liquid being the heaviest component accumulates on the inner surface of the cylinder wall 33 and flows downwardly through the slots 59 at the outer edge of the partion 55.

The gas component of the flow, on reaching the upper secondary section, reduces its violent rotational action. The gas component is laden with droplets of liquid and foam when the separator is operating near peak capacity, but the slowing down of the flow causes much of the liquid and foam to separate and flow downwardly through the passageway 34 into the lower secondary section. Almost dry gas, resulting from the separation, passes upwardly through the opening 22 and under the cap 25 for discharge through the gas outlet pipe 92. The cap 25 tends to baffle the gas in the quieting section and causes entrained particles of liquid to drip from the periphery thereof onto the partition 15. The flange 23 will prevent backflow through the opening 22 so that the liquid will flow down the passageway 18 into the bubble free liquid section 21 in the bottom of the separator shell. The violently whirling foam from the primary separating section is slowed down in the lower secondary section and loses its rotational motion.

A portion of the foam settles into bubble free liquid which mixes with the liquid coming from the primary section and passes through the passageways 44 and 49 into the bubble free liquid section 21. Some gas is separated in the lower secondary section and passes upwardly around the wall 33 of the primary section to the upper secondary section. The foam remaining in the lower secondary section passes with the liquid downwardly around the top of the first tray section 42 and builds up in the first tray section since it flows under the lower edge 45 of the wall 43. The foam builds up in the tray section until it can flow down through the tube 50 into the lower tray section 47. The gas from the first tray section flows through the gas outlet 53 into the vertical passageway 29 which delivers the gas into the upper secondary section 17 where the gas passes on into the quieting section. The foam fills up in the second tray section and overflows the weir 66 to fill the passageway 64 and float upon the body of solid oil that rises within the solid oil section 21.

Gas separated in the secondary section passes out through the gas outlet 54 into the equalizing passageway 59 for upward flow to the upper secondary section. The canopy section which houses the float completely closes the float space so that the float space is not affected by the turbulent action in the other portions of the separator. It is obvious that since the float space is closed, with the exception of the tubes 75 which depend into the bubble free liquid, only bubble free liquid can flow upwardly into the float chamber. It is also obvious that since the partitions 62 and 63 depend within the bubble free liquid they provide seals for preventing flow of foam into the space surrounding the float chamber. Therefore, the float is at all times supported on bubble free liquid to accurately control the level of the liquid. Final separation of the foam takes place in the space 64 and 65 on the outside of the canopy section. The liquid passing to the bottom of the separator and any gas flows upwardly for discharge through the outlet 54. Pressure is equalized in the float chamber through the openings 76, 77 and 78. The liquid separating in the lower tray section passes downwardly through the tube 91 in bypassing relation with the columns of foam contained in the passageway 64 and 65. Substantially bubble free liquid is discharged from the bubble free liquid section through the outlet duct 87 under control of the float as in customary practice.

From the foregoing it is obvious that I have provided a separator capable of efficient separation of the components of a mixed flow of liquid, gas and foam and that the separator will have substantial capacity to assure liquefaction of the foam.

It is also obvious that the float chamber is sealed by the liquid component of the flow so that the float is at all times operating on bubble free liquid.

What I claim and desire to secure by Letters Patent is:

1. In a separator of the character described, a primary separating section, secondary separating sections located respectively above and below the primary separating section and having connections through axially arranged openings, means for effecting circumvolution of a combined liquid, gas and foam flow in the primary separating section to effect primary separation of the liquid from the gas and foam components of the flow to cause discharge of the gas and lighter foam into the upper secondary separating section and heavier foam into the lower secondary separating section, a gas quieting section having connection with the upper secondary separating section, a tray section below the lower secondary separating section for receiving the foam component from the lower secondary separating section, vent means directly connecting the tray section with the gas quieting section in bypassing relation with the separating sections, a liquid collecting section below the tray section, a canopy section between the tray section and liquid collecting section for housing a float adapted to operate on liquid admitted into the canopy section from the liquid collecting section, means for discharging liquid from the liquid collecting section, and means for discharging gas from the gas quieting section.

2. In a separator of the character described, a primary separating section, secondary separating sections located respectively above and below the primary separating section and having connections through axially arranged openings, means for effecting circumvolution of a combined liquid, gas and foam flow in the primary separating section to effect primary separation of the liquid from the gas and foam components of the flow to cause discharge of the gas and lighter foam into the upper secondary separating section and heavier foam into the lower secondary separating section, a gas quieting section having connection with the upper secondary separating section, a plurality of superimposed tray sections below the lower secondary separating section for receiving successively the foam component from the lower secondary separating section, a duct connecting the tray sections for passing said foam remaining in the upper tray section to the lower tray section, a liquid collecting section below the lower tray section and having a flow connection therewith to pass the liquid resulting in the lower tray section, means in the liquid collecting section for housing a float adapted to operate on liquid admitted from the liquid collecting section, a vent between the tray sections and the gas quieting section, means for discharging liquid from the liquid collecting section, means for discharging gas from the gas quieting section, and pressure equalizing duct means connecting the liquid collecting section with the gas quieting section.

3. A separator of the character described including a substantially elongated cylindrical vessel, means supporting the vessel with the axis thereof in perpendicular position, an inner cylinder of smaller diameter than the vessel, means supporting the cylinder within the vessel intermediate the ends of said vessel and to provide a downflow passageway substantially encircling the inner cylinder, said inner cylinder having an open bottom and a top provided with an axial gas outlet opening, a transverse partition between said top of the cylinder and the upper end of the vessel to divide the vessel into an upper secondary separating section and a gas quieting section, said partition having an axial opening for connecting the upper secondary section with the gas quieting section, a transverse partition in the inner cylinder for dividing the inner cylinder into a primary separating section and a lower secondary separating section, said partition having an axial opening connecting said sections for passing foam and having openings immediately adjacent the wall of the inner cylinder for passing liquid into the lower separating section, a duct extending through the wall of the vessel and discharging tangentially into the primary separation section of the inner cylinder for admitting gas, liquid and foam to be separated, a plurality of tray sections supported in the vessel below the inner cylinder, a flow passageway connecting the lower secondary separating section with the upper tray section for passing foam into the upper tray section, an axial tube connecting the upper tray section with the lower tray section for passing foam from the upper tray section into the lower tray section, laterally spaced vertical partitions cooperating with the wall of the vessel below the lower tray section to provide overflow flumes for foam from the lower tray section, means forming a closed float chamber intermediate the vertical partitions and having an inlet depending into liquid collecting in the bottom of the vessel and having gas vents into space above the level of said collected liquid, a float in the float chamber, said vertical partitions extending into the collected liquid to form foam and gas seals for preventing passage of foam and gas into the float chamber, means for discharging said liquid from the vessel, means for conducting gas released in said tray sections to the gas quieting section, and means for discharging gas from the gas quieting section.

4. A separator of the character described including a substantially elongated cylindrical vessel, means supporting the vessel with the axis thereof in perpendicular position, means forming a gas quieting section in the upper end of the vessel, an upper secondary separating section below the gas quieting section, a primary separating section below the upper secondary separating section and a lower secondary separating section below the primary separating section, all in axial communication, means for admitting a liquid gas and foam flow into the primary separating section for primary separation and for secondary separation in the secondary separation sections, a plurality of tray sections supported in the vessel below the lower secondary separating section, a flow passageway connecting the lower secondary separating section with the upper tray section for passing foam into the upper tray section, an axial tube connecting the upper tray section with the lower tray section for passing foam from the upper tray section into the lower tray section, said tray sections having separate liquid outlets to the lower end of the vessel for passing liquid liquefied from said foam, duct means separate from said liquid outlets for passing foam from the lower tray section for support on the liquid collected in the lower end of the vessel, means forming a float chamber in the lower end of the vessel in separation from said duct means by a liquid seal, means for admitting liquid to the float chamber and excluding foam, a float in the float chamber, means for discharging liquid from the liquid collecting section, and means for discharging gas from the gas quieting section.

5. A separator of the character described including a substantially elongated vessel, means supporting the vessel with the axis thereof in perpendicular position, means in the vessel for separating gas, liquid and foam components of a well flow, means for conducting the separated gas to the top of the vessel, means for conducting separated liquid to the bottom of the vessel, means for effecting liquefaction of the foam, laterally spaced vertical partitions cooperating with the wall of the vessel near the bottom thereof to provide overflow flumes for foam from the foam liquefaction means, a transverse partition connecting the vertical partitions in downward spaced relation with their upper ends to form a foam collecting tray over the separated liquid collecting in the bottom of the vessel and weirs over which foam flows from the tray into said overflow flumes, means cooperating with the transverse partition forming sides and bottom of a closed float chamber intermediate the vertical partitions, said bottom of the float chamber having an inlet depending into the separated liquid and having vents into space above the level of separated liquid, a float in the float chamber, said vertical partitions extending into the liquid at the side of the float chamber to form foam and gas seals for preventing passage of foam and gas to the float chamber by way of said vents, means for discharging the liquid from the vessel, and means for discharging gas from the top of the vessel.

6. A separator of the character described including a substantially elongated cylindrical vessel, means supporting the vessel with the axis thereof in perpendicular position, an inner cylinder of smaller diameter than the vessel, means supporting the cylinder within the vessel intermediate the ends of said vessel and to provide a downflow passageway substantially encircling the inner cylinder, said inner cylinder having an open bottom and a top provided with an axial gas outlet opening, a transverse partition between said top of the cylinder and the upper end of the vessel to divide the vessel into an upper secondary separating section and a gas quieting section, said partition having an axial opening for connecting the upper secondary section with the gas quieting section and spaced above said opening, a transverse partition in the inner cylinder for dividing the inner cylinder into a primary separating section and a lower secondary separating section, said partition having an axial opening connecting said sections and openings immediately adjacent the wall of the inner cylinder, a duct extending through the wall of the vessel and discharging tangentially into the primary separating section of the inner cylinder, a plurality of tray sections supported in the vessel below the inner cylinder, a flow passageway connecting the lower secondary separating section with the upper tray section for passing foam into the upper tray section, an axial tube connecting the upper tray section with the lower tray section for passing foam from the upper tray section into the lower tray section, laterally spaced vertical partitions cooperating with the wall of the vessel to provide overflow flumes for foam from the lower tray section, a transverse partition connecting the vertical partitions in downward spaced relation with their upper ends to form the bottom of the lower tray section and a top of a liquid collecting section in the bottom of the vessel, means forming a closed float chamber intermediate the vertical partitions and having an inlet depending into the liquid collecting section and having gas vents into space above the level of liquid trapped in the liquid collecting section, a float in the float chamber, said vertical partitions extending into the liquid which is to be trapped in the liquid collecting section to form foam and gas seals for preventing passage of foam and gas into the float chamber, means for discharging liquid from the liquid collecting section, means for discharging gas from the gas quieting section, a downflow duct connecting the gas quieting section, a downflow duct connecting the gas quieting section with the liquid collecting section, and a duct connecting the tray sections with the upper secondary section.

7. In a separator comprising a vertically arranged vessel, a foam liquefying section in said vessel comprising, a transverse partition of smaller diameter than the vessel, a skirt depending from the periphery of the partition to provide a foam liquefying space and cooperating with the wall of the vessel to provide a passageway for the downflow of foam and liquid toward the bottom of the vessel, a lower transverse partition spaced below the terminal of the skirt to provide an inlet for foam from the passageway into said space, a vertical duct extending downwardly from the last-named partition to form a continuation of said passageway through which liquid drains from above said partitions to the bottom of the vessel, a third transverse partition spaced below the second to provide a second foam liquefying space therebetween and having sides spaced inwardly from the wall of the vessel, vertical partitions connected with said spaced sides and having upper ends projecting above the third partition to form weirs for collection of foam on said partition and over which said foam flows through flumes provided by said vertical partitions for support on the body of liquid adapted to collect in the bottom of the vessel, a tubular duct connecting the foam liquefying spaces to transfer foam from the upper space to the lower space, a duct connected with the lower space for draining liquid to the bottom of the vessel, a float housing in the bottom of the vessel and having an inlet for said liquid separated from said flumes and flow passageway by liquid seals, an offtake duct connected with the lower portion of the vessel to discharge the liquid, a valve in said duct, a float in the float housing, and an operating connection between the float and valve.

8. In a separator comprising a vertically arranged vessel, a foam liquefying section in said vessel comprising, a transverse partition of smaller diameter than the vessel, a skirt depending from the periphery of the partition to provide a foam liquefying space and cooperating with the wall of the vessel to provide a passageway for the downflow of foam and liquid toward the bottom of the vessel, a lower transverse partition spaced below the terminal of the skirt to provide an inlet for foam from the passageway into said space, a vertical duct extending downwardly from the last-named partition to form a continuation of said passageway through which liquid drains from above said partitions to the bottom of the vessel, a third transverse partition spaced below the second to provide a second foam liquefying space therebetween and having sides spaced inwardly from the wall of the vessel, vertical partitions connected with said spaced sides and having upper ends projecting above the third partition to form weirs for collection of foam on said partition and over which said foam flows through flumes provided by said vertical partitions for support on the body of liquid adapted to collect in the bottom of the vessel, a tubular duct connecting the foam liquefying spaces to transfer foam from the upper space to the lower space, a duct connected with the lower space for draining liquid to the bottom of the vessel, a float housing in the bottom of the vessel and having an inlet for said liquid separated from said flumes and flow passageway by liquid seals, an offtake duct connected with the lower portion of the vessel to discharge the liquid, a valve in said duct, a float in the float housing, and an operating connection between the float and valve, said float housing having a vent duct extending to the upper portion of the vessel in bypassing relation with the foam liquefying spaces.

9. In a separator comprising a vertically arranged vessel, a foam liquefying section in said vessel comprising, a transverse partition of smaller diameter than the vessel, a skirt depending from the periphery of the partition to provide a foam liquefying space and cooperating with the wall of the vessel to provide a passageway for the downflow of foam and liquid toward the bottom of the vessel, a lower transverse partition spaced below the terminal of the skirt to provide an inlet for foam from the passageway into said space, a vertical duct extending downwardly from the last-named partition to form a continuation of said passageway through which liquid drains from above said partitions to the bottom of the vessel, a third transverse partition spaced below the second to provide a second foam liquefying space therebetween and having sides spaced inwardly from the wall of the vessel, vertical partitions connected with said spaced sides and having upper ends projecting above the third partition to form weirs for collection of foam on said partition and over which said foam flows through flumes provided by said vertical partitions for support on the body of liquid adapted to collect in the bottom of the vessel, a tubular duct connecting the foam liquefying spaces to transfer foam from the upper space to the lower space, a duct connected with the lower space for draining liquid to the bottom of the vessel, a float housing in the bottom of the vessel and having an inlet for said liquid separated from said flumes and flow passageway by liquid seals, an offtake duct connected with the lower portion of the vessel to discharge the liquid, a valve in said duct, a float in the float housing, an operating connection between the float and valve, and a vent duct having connection with the float housing and said liquefying spaces and having discharge into the upper portion of the vessel.

GARMAN O. KIMMELL.

REFERENCES CITED

The following references are of record in the file of this patent:

UNITED STATES PATENTS

| Number | Name | Date |
| --- | --- | --- |
| 2,353,833 | Kimmell | July 18, 1944 |